Dec. 16, 1969 R. C. MATTHEWS 3,484,767

MEMORY SELECTION SYSTEM

Filed June 29, 1967 4 Sheets-Sheet 1

INVENTOR
ROBERT C. MATTHEWS
BY Thomas J. Nikolai
ATTORNEY

Dec. 16, 1969 R. C. MATTHEWS 3,484,767

MEMORY SELECTION SYSTEM

Filed June 29, 1967 4 Sheets-Sheet 2

Dec. 16, 1969 R. C. MATTHEWS 3,484,767

MEMORY SELECTION SYSTEM

Filed June 29, 1967 4 Sheets-Sheet 3

United States Patent Office 3,484,767
Patented Dec. 16, 1969

3,484,767
MEMORY SELECTION SYSTEM

Robert C. Matthews, St. Paul, Minn., assignor to Sperry Rand Corporation, New York, N.Y., a corporation of Delaware Filed June 29, 1967, Ser. No. 650,100
Int. Cl. G11b 5/00
U.S. Cl. 340—174 10 Claims

ABSTRACT OF THE DISCLOSURE

A slection system for the selection, or addressing, of memory elements of an electronic data processing system having a memory cycle time of 200 nanoseconds (ns.) or less. The diverter lines and word lines that form the switching, or selection, matrix are continuous, directly intercoupled striplines that are terminated in their characteristic impedances and are interconnected so as to substantially maintain stripline characteristics. After the memory access, or memory element selection, cycle is completed the diverter lines are electronically coupled to a low impedance discharge path whereby all diverter lines are returned to their original unselected potential.

BACKGROUND OF THE INVENTION

The invention herein described was made in the course of or under a contract or subcontract thereunder with the Department of the Army.

The present invention is considered to be an improvement type invention and is specifically directed toward memory selection systems that are associated with memory systems operating in the 200 nanoeseconds or less memory cycle time range. Microwave techniques, treating the switching matrix cross conductors as strip transmission lines, have been utilized to improve operating speeds: see the copending patent application of J. A. Kolling, Ser. No. 543,263, filed Apr. 18, 1966, and assigned to the Sperry Rand Corporation as is the present invention. It is desirable that the switching matrix and the associated memory planes be packaged as a cohesive, integral unit providing substantially continuous strip transmission line characteristics throughout the selected lines of the switching matrix and the associated memory plane. Additionally, it is desirable that the signals in such lines be attenuated, or damped, as quickly as possible after the termination of the memory selection cycle whereby the cycle time be held to a minimum.

SUMMARY OF THE INVENTION

The present invention is an improvement invention providing a more economical memory selection system than prior art memory selection systems, and it is particularly directed to a memory system utilizing thin-ferromagnetic-films as the memory element which memory system has a memory cycle time of 200 nanoseconds. A memory system for which the present invention is particularly adapted is fully described in the publication "A 200-Nanosecond Thin Film Main Memory System" S. A. Meddaugh et al., Proceedings-Fall Joint Computer Conference, 1966, pages 281–292. Accordingly, it is a primary object of the present invention to provide a less expensive memory selection system.

The selection system of the present invention incorporates a plurality of stripline type diverter lines and word lines that are directly intercoupled in a switching matrix by a plurality of word line isolation diodes and multi-secondary winding transformers. The diverter lines and word lines form continuous DC electrical paths from the diverter line selection diverters into the memory array in which array the word lines are inductively coupled to the associated memory elements. Electrically intermediate the word line isolation diodes and the associated memory elements the word lines are coupled to a high permeability core to which is also coupled a word-driver line that is driven by an associated current source word driver; the word-driver line functions as a single primary winding to the plurality of associated word lines that function as the secondary windings thereto. The associated single word-driver line, plurality of word lines, and high permeability core form a stripline word line selection transformer.

Selection of one word line and the associated memory elements is achieved by concurrently enabling, or selecting, a diverter, which diverter is electrically coupled to one of the diverter lines, and a word driver, which word driver is inductively coupled to 16 word lines. The concurrently enabled diverter and word driver forward bias the associated word line isolation diode causing a word line current to be inductively coupled to the associated memory elements. After termination of the selection cycle a line charger is enabled providing a low impedance discharge path to the diverter line thereby returning the previously selected diverter line to its unselected potential. The diverter lines and word lines are terminated in their characteristic impedances minimizing any signal reflections therein.

DESCRIPTION OF THE PREFERRED EMBODIMENTS

Figure 1A:
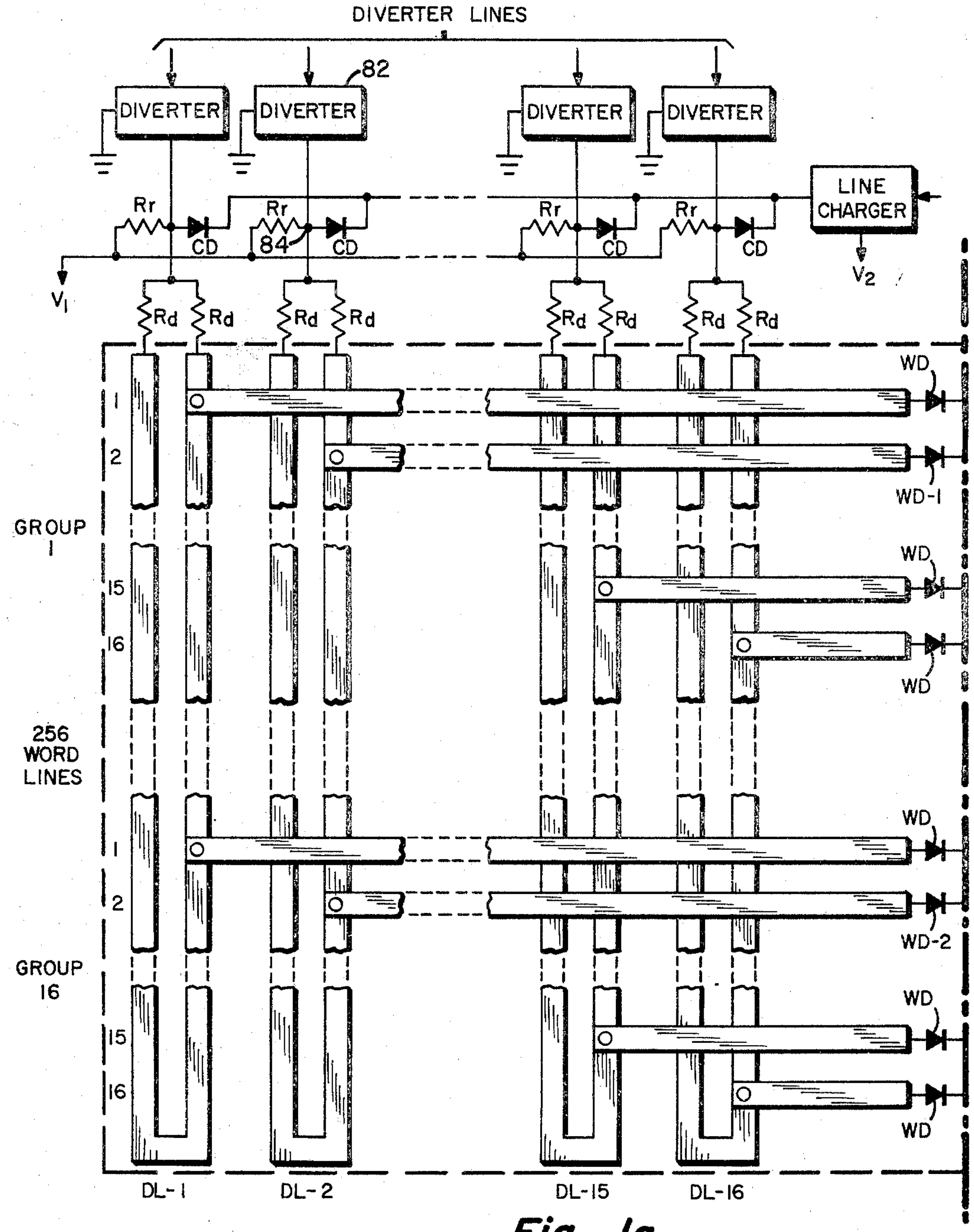
FIGS. 1*a* and 1*b* are illustrations of a thin-ferromagnetc-film memory system incorporating the present invention.
Figure 1:
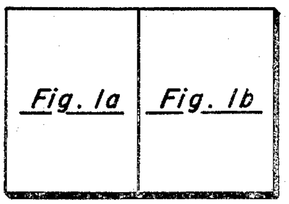
FIG. 1 is a block diagram of the arrangement of FIGS. 1*a* and 1*b*.
Figure 1B:
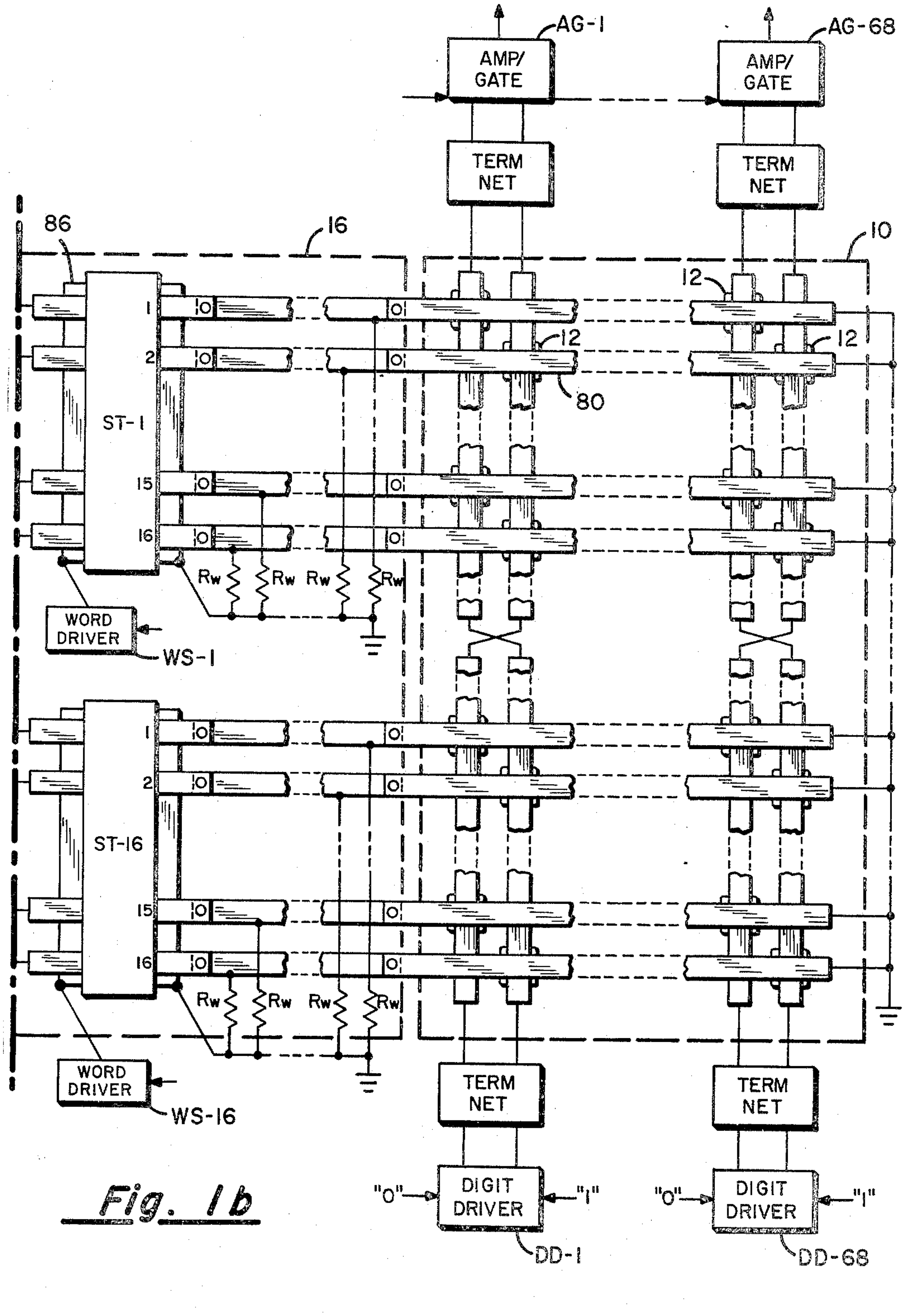

FIGS. 1*a* and 1*b* when arranged according to the arrangement of FIG. 1 provide an illustration of a preferred embodiment of the present invention that includes a word-organized thin-ferromagnetic-film memory array. The memory selection system of the illustrated embodiment includes a plurality of diverter lines DL–1 through DL–16 each formed in two half sections and each half section being terminated at a first node by a resistor $R_d$ that is equal to its respective characteristic impedance $Z_d$. Additionally, there are provided a plurality, e.g. 256, of word lines that form a continuous, or DC, circuit between memory array 10 and an associated diverter line DL–1 through DL–16. Electrically intermediate the diverter lines in memory array 10 are a plurality, e.g. 256, of word line isolation diodes WD, a separate one associated with each associated word line for providing diode isolation between the associated diverter line and memory array 10. The 256 word lines are formed into 16 groups, each of 16 word lines. Electrically intermediate memory array 10 and the word line isolation diodes, the 16 word lines of each group are coupled to a high permeability core which is also coupled to a word-driver line that is driven by an associated Word Driver, which is operated in the current mode. The arrangement is such that the word-driver line functions as a single primary winding to the 16 word lines of the associated group of word lines that function as the secondary windings thereto. The associated single word-driver line, the 16 word lines, and the high permeability core form a stripline word line selection transformer. Electrically intermediate memory array 10 and the 16 word line selection transformers ST–1 through ST–16, each of the word lines is terminated by a resistor $R_W$ that is substantially equal to the characteristic impedance $Z_W$ of that portion of the word line that extends from the associated word selection Transformer and through memory array 10 to ground.

At the first node of each of diverter lines DL–1 through DL–16 there is provided a resistor $R_r$ that couples the associated first node to a first potential source $V_1$ and a line charger isolation diode CD for coupling the associated first node to a second potential source $V_2$ through a Line Charger. Additionally, at each first node there is coupled a separately associated Diverter for selectively coupling such first node to ground.

Selection of one word line, and the associated memory elements 12 in memory array 10, is achieved by concurrently enabling a Diverter and a Word Driver. The concurrently enabled Diverter and Word Driver forward-bias the associated word line isolation diode WD causing a word line current to be inductively coupled to the associated memory elements 12 of memory array 10. At the termination of the memory selection cycle the Line Charger is enabled providing a low impedance discharge path to the selected diverter line thereby returning that line to its original unselected potential.

Due to the 200 nanosecond memory cycle time that is utilized in the illustrated embodiment it is essential that the diverter lines and those portions of the word lines that are external to memory array 10 be fabricated on a unitary substrate member providing the necessary structural and electrical characteristics. This selection array generally outlined by dashed line 16 may consist of a structural base member having on its underside a copper sheet for forming a ground plane for the printed circuit type diverter lines and word lines associated therewith. In this arrangement the diverter lines could be formed of printed circuit members of copper foil upon a Mylar base affixed to the top side of the supporting member while the word lines could consist of a second layer of printed circuit copper lines upon a Mylar base member and affixed to the diverter line surface by a suitable adhesive. The word lines may then be electrically coupled to the associated diverter lines by any well known means such as plated-through holes, conductive rivets, etc. providing electrical continuity between the word line and the associated diverter line at the selection matrix crosspoint. The word line isolation diodes WD couple the word lines at the input end of the word selection Transformer ST to the associated diverter line having a minimum spacing therebetween for the minimization of discontinuities in the so-formed strip transmission line.

Figure 2:
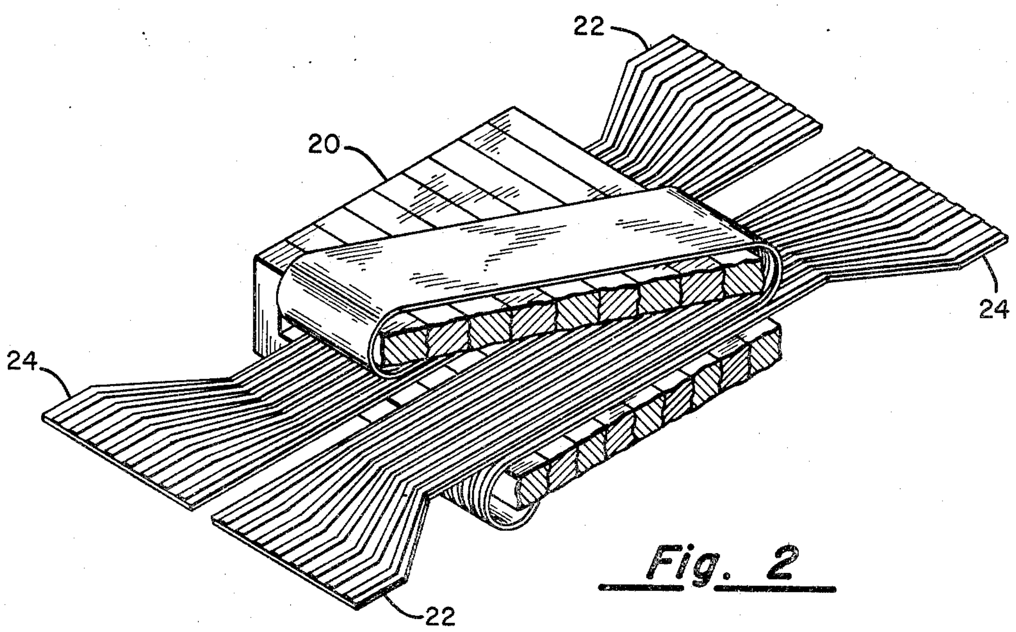
FIG. 2 is an illustration of the stripline word selection transformer utilized in the embodiment of FIG. 1.

With particular reference to FIG. 2 there is shown a diagrammatic illustration of the word selection Transformers ST of the illustrated embodiment showing the use of the stripline windings provided by well-known printed circuit techniques. For optimum word line termination access with minimum transformer core size it is preferred to form the windings of the word selection transformer in two portions whereby each half portion may easily be passed through the minimal opening provided by the core. In this arrangement, due to manufacturing requirements, the core 20 was comprised of 9 identical sections forming the unitary member 20 by suitable adhesive. In the illustrated arrangement each half 22 and 24, each containing eight stripline word lines, is wound on a bias along opposite surfaces of the core member 20 exiting on the opposite side from which it entered. As an example, portion 22 enters the central aperture of the core member 20 at the upper right hand edge, passes over the top surface of the core member 20 at an angle and reenters the central aperture at the lower right hand edge passing therethrough and exiting on the lower left hand corner. Accordingly, although this is the actual winding arrangement of the stripline word lines of the word selection Transformers ST–1—ST–16 of the illustrated embodiment of FIGS. 1*a* and 1*b* the word lines of such illustrated embodiment are illustrated as passing straight through such word selection Transformers for ease of description and claritly, it being recognized that such illustrated embodiment is of a schematic nature only.

Figure 3:
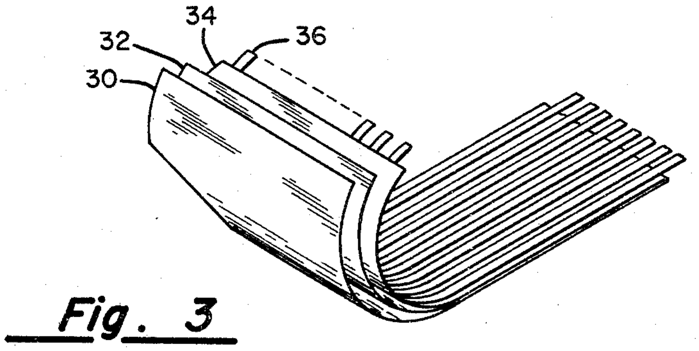
FIG. 3 is an exploded illustration of the construction of the selection transformer of FIG. 2.

With particular reference to FIG. 3 there is shown an exploded detail of a half portion of the stripline word lines of the word line selection Transformer ST of FIG. 2. In this detail there is illustrated a first insulating layer 30 of Mylar upon which is formed a continuous copper sheet 32 that functions as the word-driver line. Upon the copper sheet 32 is situated another insulation layer 34 of Mylar providing electrical insulation between it and the plurality of word lines 36 provided thereon in any well known manner. When the so-formed word line word-driver line half portions 22, 24 are installed in the core member 20 as in FIG. 2 and installed upon selection matrix 16 the two separate word-driver lines of the two half portions are electrically intercoupled forming an effective single word-driver line where the 16 word lines are electrically insulated from each other. When installed on, or coupled to, the selection matrix 16 the word lines of the word selection transformers are preferably electrically coupled to printed circuit members on the selection matrix base member. Additionally, to minimize discontinuities in the so-formed word line it is desirable that the word line portions associated with memory array 10 extend over such memory array base member overlapping corresponding word line sections on selection board 16 whereby electrical continuity therebetween is maintained with minimum discontinuities. By using the best of printed circuit techniques selection matrix 16 may be made to approach ideal stripline conditions whereby the word lines and the diverter lines may achieve an optimum operation.

Memory array 10 and the associated electronics is substantially as shown in the above referred to S. A. Meddaugh et al. article, and, consequently, no detailed discussion thereof is believed to be necessary. The arrangement therein is of the well-known word-organized system where all the bits of the multi-bit word are oriented along a single word line with all like-ordered digits of all words oriented along a single digit line. Accordingly, in the illustrated embodiment with 68 Digit Drivers, DD–1 through DD–68, and 256 word lines there is provided a word-organized memory of 256 words each of 68 digits in length. The memory elements 12 are thin-ferromagnetic-films having single domain characteristics and possessing the property of unaxial anistropy providing an easy axis along which the magnetization thereof will lie in a first or a second and opposite direction representative of the storage of a "1" or of a "0." The films are oriented in memory array 10 with their easy axes parallel to the longitudinal axes of the word lines whereby a current signal flowing down the word lines couples a transverse drive field $H_t$ to the associated films. In a corresponding manner the easy axes of the films are oriented perpendicular to the longitudinal axes of the digit lines whereby a current signal flowing down the associated digit line couples a longitudinal drive field $H_l$ of a first or of a second and opposite direction for establishing the magnetization of the associated memory element 12 in a first or second and opposite direction along the easy axis representative of the storing of a "1" or a "0" therein.

Figure 4:
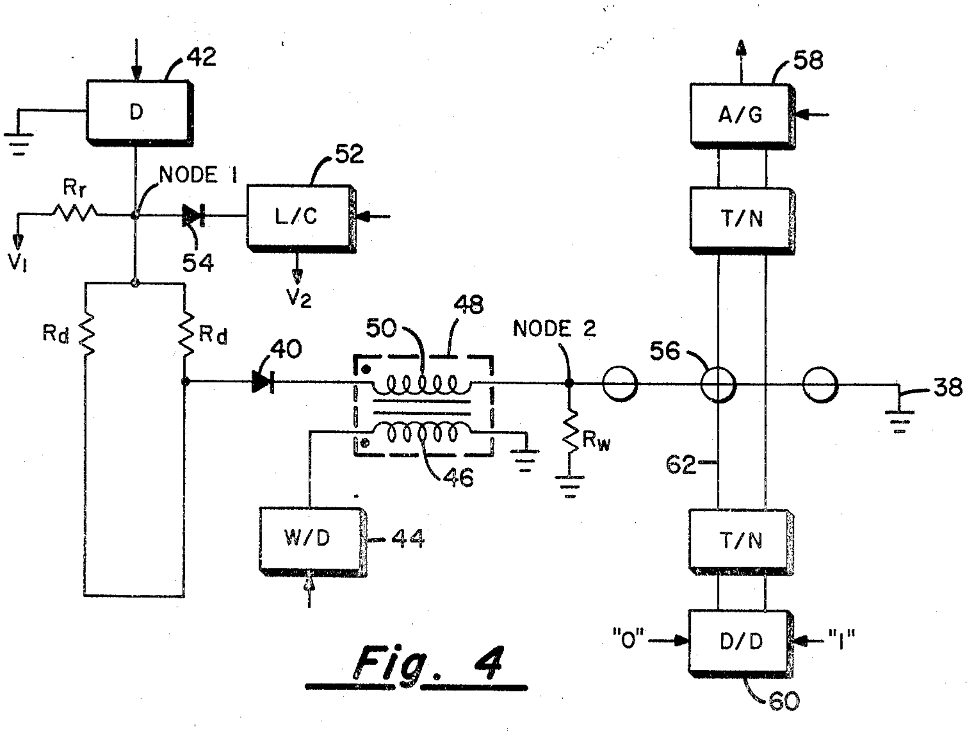
FIG. 4 is a schematic diagram of a single diverter line—word line word—drive line combination.

With particular reference to FIG. 4 there is illustrated one diverter line and word line combination illustrated for the purpose of describing in detail the operation thereof. Normally all diverter lines are coupled to a negative potential $V_1$ through the associated current limiting resistor $R_r$. With this arrangement node 1 is normally held at approximately −12 volts thereby reverse-biasing all word line isolation diodes WD such as diode 40. At this time all the word lines, such as word line 38 are substantially isolated from their associated diverter lines. This is the normal condition for all diverter lines and word lines of the illustrated embodiment of FIGS. 1*a* and 1*b* prior to a time $t_0$—see FIG. 5 for a typical timing sequence.

For the initiation of a memory cycle, at time $t_0$ diverter 42 is enabled coupling node 1 to ground therethrough. Accordingly, all word line isolation diodes WD, such as diode 40, that are associated with the selected Diverter 42 are on the threshold of conduction. Next, at a time $t_{15}$, i.e., 15 nanoseconds (ns.) after time $t_0$, Word Driver 44 is selected coupling a negative current source to the primary winding 46 of word selection Transformer 48. With the negative word selection current flowing through primary winding 46 of word selection Transformer 48 there is induced in the secondary winding 50 a voltage having a negative potential of −4.5 volts at the cathode of of word line isolation diode 40 and an effective positive potential of +5.5 volts at node 2, which is a point on word line 38 to which is coupled a resistor $R_w$ that is equal to its characteristics impedance $Z_w$. With this negative potential at the cathode of diode 40, diode 40 becomes forward-biased providing a current path therethrough, through node 1, Diverter 42 and thence to ground. Concurrently, there is provide at node 2 a positive potential of approximately +5.5 volts providing a positive current pulse through word line 38 and thence to ground. At the grounded end of word line 38 this word line selection pulse is reflected back along word line 38 and at node 2 is absorbed by the resistor $R_w$ at word line 38. Accordingly, to ensure proper word line selection the magnitude of the negative potential on the anodes of the unselected word line isolation diodes WD and the associated selection transformer must be greater than the magnitude of the largest negative potential developed at the primary side of the word line selection Transformer. The magnitude of resistor $R_d$ must be selected to ensure that the potential at any point on the selected diverter line does not exceed 0 volts when the Word Driver is turned off. If the diverter line delay time $T_d$ is along relative to the fall time of the word line current pulse $R_d$ must be approximately equal to or greater than the characteristic impedance $Z_d$ of the diverter line. An added advantage that is gained by selecting a resistor $R_d$ of this value is that the diverter charging current cannot exceed $V_1/Z_d$ even for an infinitely long diverter line. If these requirements are satisfied sneak currents due to diode WD conduction of unselected lines will not occur.

Turn-off of word line current is accomplished by turn-of off the Word Driver at time $t_{115}$. Recovery of the selected word line 38 presents no ringing problem as one end of the selected word line 38 is grounded while the other end is terminated in resistor $R_w$ that is equal to its characteristic impedance $Z_w$. However, upon turn-off of the selected diverter line and the associated Diverter it is necessary to discharge the previously selected diverter line through the use of Line Charger 52 that is coupled to all diverter lines through an associated line charger isolation diode 54. Accordingly, at a time $t_{145}$ Line Charger 52 is enabled coupling the cathode of diode 54 to a potential $V_2$ of −13 volts which effectively establishes node 1 at a negative potential of −12 volts. The Line Charger 52 and diverter isolation diode 54 arrangement is utilized to permit the use of a relatively high limiting resistor $R_r$ for coupling node 1 to the negative potential $V_1$ of −12 volts. If the Line Charger 52 and diverter isolation diode 54 were not utilized such limiting resistor $R_r$ would be required to be of substantially lower value so as to permit a rapid discharge of the selected diverter line therethrough to the negative potential $V_1$. However, with this arrangement the power ratings of both $R_r$ and Diverter 42 would have to be significantly increased over that of the illustrated embodiment. Thus, the illustrated arrangement permits the use of lower power Diverters, and, consequently, substantial savings in power requirements. Subsequently, at a time $t_{185}$ Line Charger 52 is turned off permitting the memory selection system to return to its normal state whereupon, after a cycle time of 200 nanoseconds, i.e. at a time $t_{200}$, the above sequence can be repeated.

As is well known, word-organized memory systems are arranged such that all the bits of the word are arranged along a single word line whereby selection of that single word line selects all the multi-bits of the associated word. Thus, for the read operation of the present invention memory selection is as described above. However, at a time $t_{10}$ Amplifier-Gate 58 is enabled, one Amplifier-Gate AG being associated with each bit of the multi-bit word associated with the selected word line. After detection of the read out signals, due to the selection of the selected word line 38, the Amplifier-Gates, such as Amplifier-Gate 58 of FIG. 4, are turned off at a time $t_{70}$.

For the write operation it is necessary that concurrent with the selection of the particular word line a Digit Driver DD be enabled, one Digit Driver being associated with each bit of the multi-bit word associated with the selected word line. Thus, for the writing of a "1" or a "0" into bit 56 of word line 38 it is necessary that Digit Driver 60 be enabled for coupling apositive or a negative signal to the associated digit line 62. Thus, with the memory selection system as described above the selection of word line 38 couples a transverse drive field $H_t$ to the memory elements associated therewith, such as bit 56 causing the magnetization thereof to rotate out of alignment with its easy axis, which is substantially aligned with the longitudinal axis of word line 38. Concurrently therewith, with the magnetization of bit 56 rotated out of alignment with its easy axis and at a time $t_{90}$—see FIG. 5—Digit Driver 60 is enabled causing it to couple a first, or a second and opposite, polarity digit drive pulse to digit line 62 which first or second and opposite polarity digit pulse causes the magnetization of bit 56 to be rotated in a first or a second direction along its easy axis. Upon the turn-off of Word Driver 44 at time $t_{115}$ the magnetization of bit 56, still under the influence of the digit drive field, is aligned along its easy axis in accordance with the polarity of the applied digit pulse. Next, at a time $t_{140}$ Digit Driver 60 is turned-off with the magnetization of bit 56 residing along its easy axis in the polarity as determined by the polarity of the coupled digit pulse.

With particular reference to the preferred embodiment of the present invention as illustrated in FIGS. 1*a* and 1*b* there is illustrated a selection system coupled to a word-organized memory array 10 of 256 words each of 68 digits in length. As stated above the memory selection system of the present invention includes a plurality of word lines, 256 word lines in the illustrated embodiment, divided into a plurality of groups of word lines, 16 groups each including 16 word lines. Additionally there is provided a plurality of diverter lines, 16 in the illustrated embodiment, each diverter line associated with one word line of each of the 16 groups. The word lines are substantially continuous striplines intercoupling the associated memory elements of memory array 10 to the associated diverter line. Intermediate memory array 10 and the diverter lines DL-1—DL-16 and for each group of word lines there is provided a stripline word line selection Transformer, 16 in the illustrated embodiment denoted ST-1 through ST-16. Each of these selection Transformers is, as discussed with particular reference to FIGS. 2 and 3, comprised of a high permeability core 20, a printed circuit type word selection line 32 and a plurality of word lines 36, which word lines pass therethrough providing a DC current path between the associated memory elements 12 of memory array 10 and the associated diverter line. On the input end of each of the word selection Transformers each word line is separately coupled to its associated diverter line by a word line isolation diode WD for providing diode isolation between memory array 10 and the diverter lines.

In order that the memory selection system of the illustrated embodiment is able to operate at the high frequency required, e.g., 200 nanoseconds in the illustrated embodiment, it is essential that the diverter lines and word lines conform to the requirements of a strip transmission line having a minimum of discontinuities therein. Additionally, to perform their function as striplines it is essential that such diverter lines and word lines be properly terminated in resistances $R_d$ and $R_w$ equal to their characteristic impedances $Z_d$ and $Z_w$, respectively. Accordingly, each diverter line is formed of two half sections, each half section terminating in resistor $R_d$ at its first node as described in more detail with respect to FIG. 4. Additionally, each word line, intermediate memory array 10 and the word selection Transformer, is coupled to ground by its resistor $R_w$. Additionally, with respect to the word-driver line of each of the word selection Transformers the output end of each word-driver line is coupled to ground while the input end is coupled to a word driver, the arrangement having the proper characteristic impedance and delay to operate most effectively with the particular arrangement utilized.

Each diverter line is at its terminating node 1 separately coupled to a first voltage source $V_1$ by a current limiting resistor $R_r$ and is coupled to a line charger by an associated line charger isolating diode CD. Additionally, a separate diverter is coupled to each diverter line terminating node 1 for the independent and selective selection of the associated diverter line. For simplifying the illustrated embodiment of FIGS. 1*a* and 1*b* like components are identified by like reference letters, i.e., the resistor equal to the characteristic impedance of each half section of each diverter line is identified by the reference $R_d$. In order to facilitate an understanding of the operation of the present invention the following group of actual values and characteristics for the elements of FIGS. 1*a* and 1*b* are presented below. It should be understood that the principles of operation of the present invention may be present in circuits having a wide range of individual specifications so that the list of values here presented should not be construed as a limitation thereto.

| Component: | Characteristic |
|---|---|
| Diverter lines—each half section: | |
| $Z_0$ (characteristic impedance/ground) | 12.0 ohms. |
| $T_d$ (delay) | 7.5 ns. |
| Driver lines (from Word Driver to Selection Transformer): | |
| $Z_0$ | 15 ohms. |
| $T_d$ | 1 ns. |
| Word lines: | |
| $Z_0$ | 18.0 ohms. |
| $T_d$ | 2.0 ns. |
| Selection Transformer: | |
| Core material | Indiana General Ferramic 0–6, 9 sections each 0.6 inch long time 0.2 inch high times 0.08 inch thick having central aperture therethrough forming 0.10 walls therein. |
| $Z_0$ (Primary Ref. to each secondary) | 9.0 ohms. |
| Number of turns | 2. |
| Primary/secondary turns ratio | 1/1. |
| Diodes: | |
| WD | Fairchild FDA 631. |
| CD | Fairchild FDA 631. |
| Resistors: | |
| $R_d$ | 12.0 ohms. |
| $R_r$ | 470 ohms. |
| $R_w$ | 18.0 ohms. |
| Voltages: | |
| $V_1$ | −12.0 volts. |
| $V_2$ | −13.0 volts. |

As stated above normally all diverter lines DL–1 through DL–16 are held at a negative potential thereby reverse-biasing all word line isolation diodes WD. Selection of one word line is initiated by enabling one Diverter. This charges one diverter line at its node 1 to ground potential whereby all word line isolation diodes WD coupled to this selected diverter line are placed at their threshold of conduction. Concurrently therewith, one Word Driver is enabled, which through transformer action at the associated word selection Transformer ST develops a negative potential at the cathodes of all word line isolation diodes WD coupled thereto, only one of which word line isolation diodes WD is concurrently affected by the one selected diverter line and the one selected word-driver line. Therefore, this one selected word-driver line forward-biases associated word isolation diode WD causing a word selection current signal to flow through the associated word line in memory array 10. To ensure proper selection of only one predetermined word line, the magnitude of the negative potential of the anodes on the unselected diodes WD that are associated with the driven selection Transformer must be greater than the magnitudes of the largest negative voltage developed at the primary, or Word Driver, side of the word selection Transformer ST. If this requirement is satisfied, sneak currents due to unselected, or partially selected, word line isolation diodes WD will not occur.

Turn-off of the selected word line current is accomplished by turning off the enabled Word Driver. Recovery of the selected word line presents no undue problem as the far end of the word line in memory array 10 is coupled to ground while the other end, intermediate the word selection Transformer ST and memory array 10 is terminated in an impedance that is substantially equal in value to the characteristic impedance of the word line. Upon turn-off of the selected Diverter it is necessary to discharge the selected Diverter through the use of a Line Charger which Line Charger is coupled to all diverter line node 1's through a separately associated line charger isolation diode CD. By utilizing a separate line charger circuit the ratings of the current limiting resistors $R_r$ and the Diverter circuits may be made substantially lower in power requirements than would otherwise be required. However, with the use of a substantially high value of $R_r$ the selected diverter line would require too long a time to discharge therethrough. Thus, the Line Charger, by substantially instantaneously coupling the associated node 1's of the Diverter lines to ground, permits the rapid discharge of the diverter lines therethrough.

As an example of the operation of the illustrated embodiment of FIGS. 1*a* and 1*b* presume it is desired to select word line 80. In accordance with the timing diagram as previously discussed in FIG. 5 with respect to the embodiment of FIG. 4, at time $t_0$ Diverter 82 would be enabled causing it to be turned-on. This would substantially immediately couple first node 84, associated with diverter line DL–2, to ground through Diverter 82 whereby all word isolation diodes WD such as diodes WD–1 and WD–2, would have their anodes coupled substantially to ground potential whereby such word isolation diodes WD–1 and WD–2 would be placed substantially near their point of conduction. At a subsequent time $t_{15}$, Word Driver WS–1 would be enabled coupling the current source to the input side of the associated word-driver line 86. This enabling of Word Driver WS–1 would induce an appropriate voltage in the secondary windings, formed by the associated word lines of Transformer ST–1 placing a negative potential at the cathodes of all of the word isolation diodes WD coupled to the associated word lines. With only word line isolation diode WD–1 having its anode substantially near ground potential and its cathode at a substantially negative potential it alone would be forward-biased coupling an appropriate word line drive current to the output side of Transformer ST–1 and thence to the memory elements 12 that are inductively coupled to the selected word line 80.

Figure 5:
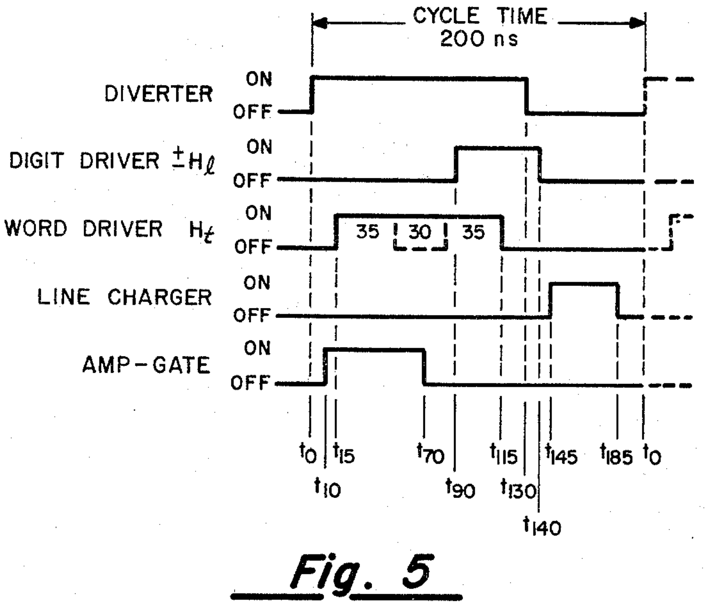
FIG. 5 is a typical timing diagram of the system of FIGS. 1*a* and 1*b*.

As with the above discussed operation of FIGS. 4 and 5 the enabling of Amplifier-Gates AG–1 through AG–68 as at time $t_{10}$ of FIG. 4 would permit the reading out of the information stored in memory elements 12 that are associated with the selected word line 80. Additionally, as previously described with respect to FIGS. 4 and 5, at the enabling of Digit Drivers DD–1 through DD–68 at time $t_{15}$ with an appropriate enabling pulse for the writing of a "1" or of a "0" in the associated memory elements 12 such memory elements may have their magnetization established in the first or second and opposite direction along their easy axes indicative of the writing of a "1" or a "0" therein.

Thus, it is apparent that there has been described and illustrated herein a preferred embodiment of the present invention that provides an improved selection system for a memory system having a memory cycle time of 200 nanoseconds or less. It is understood that suitable modifications may be made in the structure as disclosed provided that such modifications come within the spirit and scope of the appended claims. Having, now, fully illustrated and described my invention, what I claim to be new and desire to protect by Letters Patent is set forth in the appended claims.

I claim:

1. In a memory system, a transformer-diode selection system, comprising:
- a stripline diverter line;
- a stripline word-driver line;
- a stripline word line coupled to a plurality of associated memory elements;
- said word-driver line transformer coupled to said word line;
- a word line isolation diode directly intercoupling said word line to said diverter line;
- a current limiting means intercoupling a first end of said diverter line to a first potential source;
- a diverter means coupled to the first end of said diverter line;
- a word driver coupled to said word-driver line; and,
- said word driver when energized selectively forward biasing said word line isolation diode for coupling a memory selection signal to said word line.

2. The system of claim 1 wherein said diverter line is comprised of two similar half sections each terminated by at said first end by a resistor $R_d$ that is equal to the characteristic impedance $Z_d$ of each half section.

3. The system of claim 2 wherein said word line, intermediate said transformer-coupled word-driver line and said memory elements, is coupled to a second potential source by a resistor $R_w$ that is equal to the characteristic impedance $Z_w$ of said word line.

4. The system of claim 3 wherein said word line at the end beyond said associated memory elements is coupled directly to ground.

5. In a memory system, a transformer-diode selection system, comprising:
- a stripline diverter line;
- a stripline word-driver line;
- a stripline word line coupled to a pluarlity of associated memory elements;
- said word-driver line transformer-coupled to said word line;
- a word line isolation diode directly intercoupling said word line to said diverter line;
- a relatively high impedance current limiting means intercoupling a first end of said diverter line to a first potential source;
- a diverter coupled to the first end of said diverter line;
- a line charger;
- a line charger isolation diode intercoupling said line charger to said diverter line first end; and,
- said line charger means selectively forward biasing said line charger isolation diode for coupling said diverter line first end to a second potential source through a relatively low impedance path for damping the signal in said diverter line.

6. The system of claim 5 wherein said diverter line is terminated at said first end by a resistor $R_d$ that is equal to the characteristic impedance $Z_d$ of said diverter line.

7. The system of claim 6 wherein said word line, intermediate said transformer-coupled word-driver line and said memory elements, is coupled to ground by a resistor $R_w$ that is equal to the characteristic impedance $Z_w$ of said word line.

8. The system of claim 7 wherein said word line at the end beyond said associated memory elements is coupled directly to ground.

9. In a memory system, a transformer-diode selection system comprising:
- a plurality of stripline diverter lines;
- a plurality of stripline word lines;
- a stripline word-driver line;
- said word-driver line and said word lines coupled to a high permeability core for forming a stripline word selection transformer, said word-driver line functioning as the primary winding and said word lines functioning as the secondary windings thereof;
- a word driver;
- a plurality of diverters;
- a plurality of word line isolation diodes;
- a plurality of diverter line biasing resistors $R_r$;
- said word-driver line on the output end of said word selection transformer coupled to a first potential source;
- said word-driver line on the input end of said word selection transformer coupled to said word driver;
- each of said word lines on the input end of said word selection transformer directly coupled to a saparately associated one of said diverter lines by a separate one of said word line isolation diodes;
- each of said word lines on the output end of said word selection transformer coupled to a plurality of associated memory elements;
- a separate one of said biasing resistors $R_r$ separately coupling a first end of each of said diverter lines to a second potential source; and
- one of said word lines selected by the concurrent selection of said word driver and of one of said diverters.

10. In a memory system, a transformer-diode selection system comprising:
- a plurality of stripline diverter lines;
- a plurality of stripline word lines;
- a stripline word-driver line;
- said word-driver line and said word lines coupled to a high permeability core for forming a stripline word selection transformer, said word-driver line functioning as the primary winding and said word lines functioning as the secondary windings thereof;
- a word driver;
- a line charger;
- a plurality of diverters;
- a plurality of word line isolation diodes;
- a plurality of line charger isolation diodes;
- a plurality of resistors $R_d$ each equal to the diverter line characteristic impedance $Z_d$;
- a plurality of resistors $R_w$ each equal to the word line characteristic impedance $Z_w$;
- a plurality of diverter line biasing resistors $R_r$;
- said word-driver line on the output end of said word selection transformer coupled to a first potential source;

said word-driver line on the input end of said word selection transformer coupled to said word driver;

each of said word lines on the input end of said word selection transformer directly coupled to a separately associated one of said diverter lines of a separate one of said word line isolation diodes;

each of said word lines on the output end of said word selection transformer coupled to a plurality of associated memory elements, each of said word lines at a point intermediate said word selection transformer and said associated memory elements coupled to ground by one of said resistors $R_w$ and at the end beyond said associated memory elements coupled to a second potential source;

the first end of each of said diverter lines coupled by one of said resistors $R_d$ to an associated first node;

a separate one of said biasing resistors $R_r$ separately coupling each of said associated first nodes to a third potential source;

a separate one of said line charge isolation diodes separately coupling each of said associated first nodes to said line charger;

one of said word lines selected by the concurrent selection of said word driver and of one of said diverters; and, improved signal damping obtained in said selected word line and said selected diverter line after the selection thereof by the incorporation therein of proper terminations and by the energization of said line charger for providing a relatively low impedance path of the associated selected diverter line first node to a fourth potential source.

References Cited

UNITED STATES PATENTS 3,174,137 3/1965 Khambaty et al. ---- 340—174

BERNARD KONICK, Primary Examiner

S. B. POKOTILOW, Assistant Examiner